Patented July 24, 1951

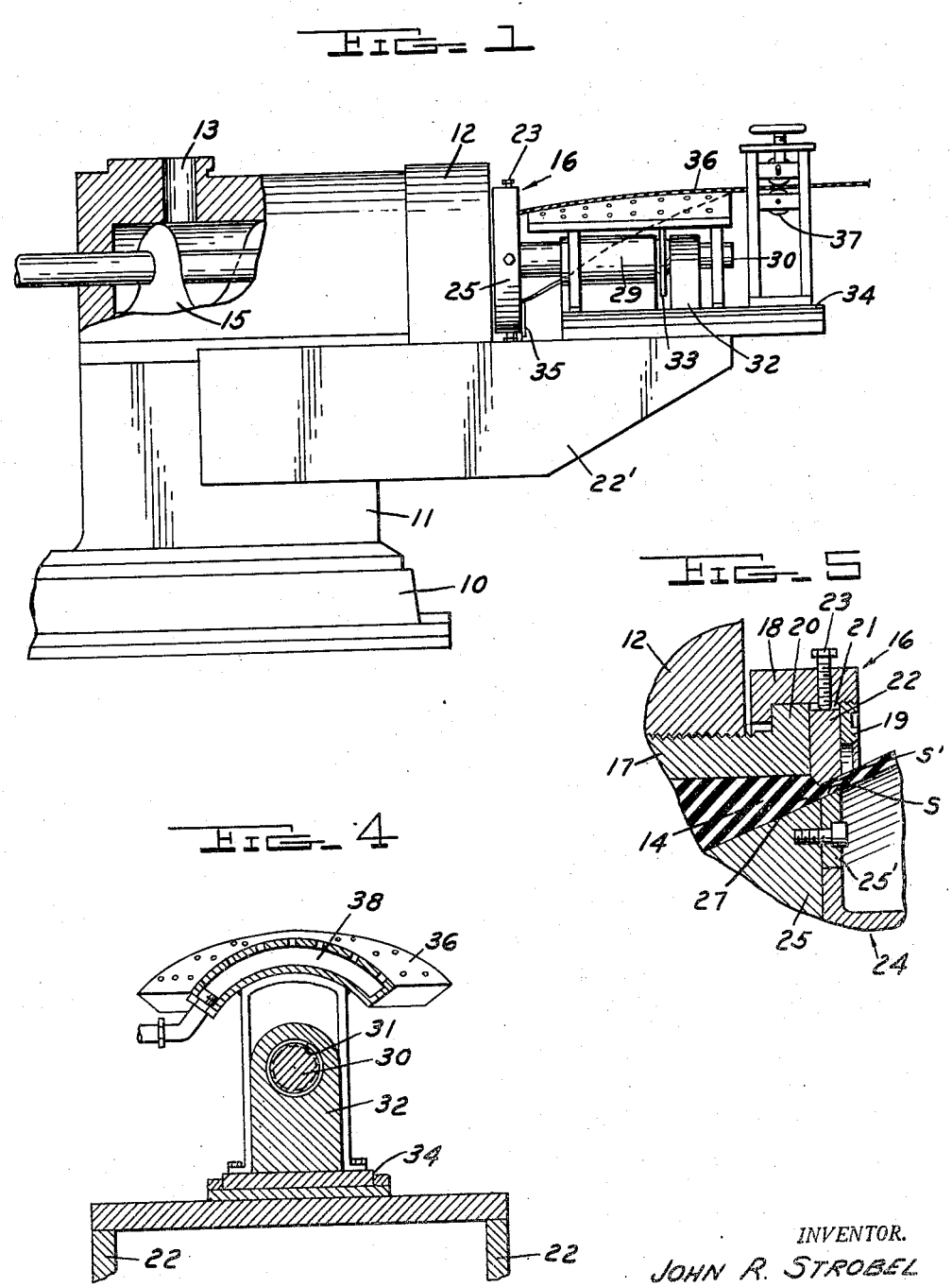

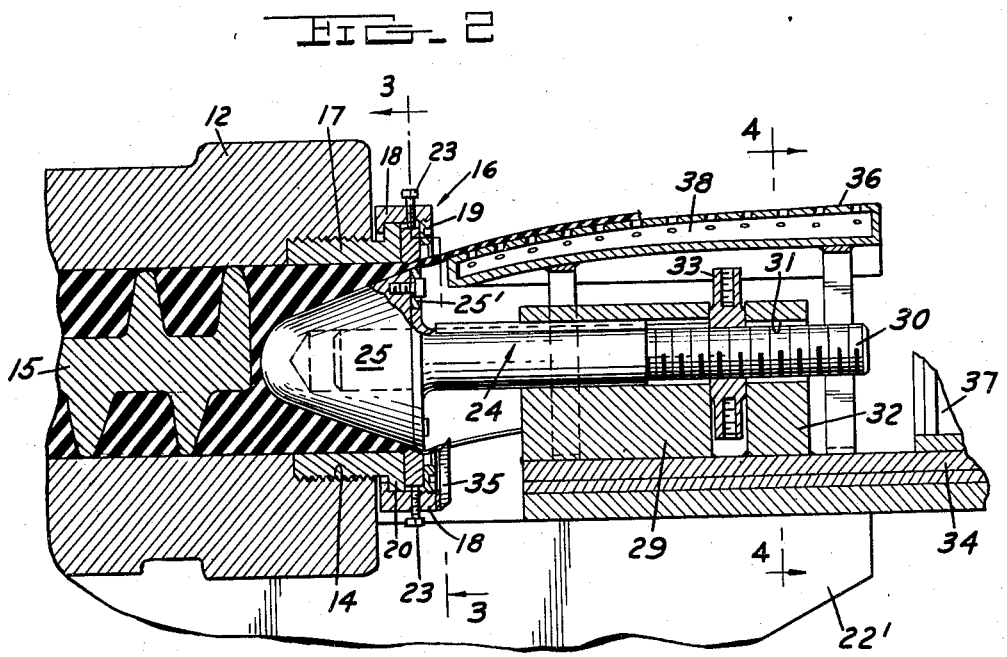
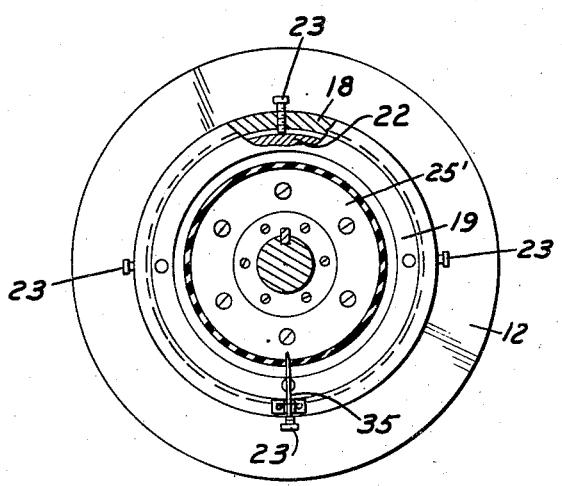

2,562,135

UNITED STATES PATENT OFFICE 2,562,135

EXTRUDING APPARATUS

John R. Strobel, Pontiac, Mich., assignor to Baldwin Rubber Company, Pontiac, Mich., a corporation of Michigan Application July 25, 1949, Serial No. 106,596

3 Claims. (Cl. 18—14)

1

This invention relates generally to apparatus for extruding material, and refers more particularly to improvements in extruding apparatus of the type wherein the material is extruded through a die around a mandrel to form a tube.

In apparatus of the above general type, it has been the practice to support the mandrel within the die opening by an apertured plate commonly known as a spider or web supported at the entrant side of the die. The arrangement is such that the material is forced through the apertures in the web before passing through the annular clearance space provided between the mandrel or pin and adjacent surface of the die. One objection to apparatus operating on the above principle is that the finished product or the material leaving the delivery side of the die possesses flow marks. These marks are formed by contact of the material with the sides of the apertures in the web during the extruding operation, and are visible in the finished product.

With the above in view it is one of the objects of this invention to provide apparatus rendering it possible to extrude material through a suitable die without marking or otherwise marring the surface of the extruded product. In accordance with this invention the mandrel is supported beyond the delivery side of the die and the apertured web mentioned in the preceding paragraph is omitted. Thus the material to be extruded is forced from the pressure chamber directly through the die and is not subjected to any action that may mark or otherwise mar the extruded product.

Another object of this invention is to support the mandrel on a slide supported beyond the delivery side of the die for movement in directions toward and away from the die. With such an arrangement the mandrel may be quickly withdrawn from the die opening and the latter may be readily cleaned or otherwise serviced.

Still another object of this invention is to provide an extruding apparatus wherein the mandrel is mounted on the slide for adjustment axially of the die and wherein the adjacent portions of the mandrel and die are correspondingly tapered to enable varying the size of the annular die opening or gage of the material extruded through the die opening.

A further object of this invention is to support a knife at the delivery side of the die in a position to slit the tubular stock issuing from the die opening to form a flat sheet having a width approximating the circumference of the tube.

A still further feature of this invention is to provide means for guiding the slit stock in the form of a flat sheet to suitable power driven rolls which serve to feed the stock in a direction away from the die.

The foregoing as well as other objects will be made more apparent as this description proceeds, especially when considered in connection with the accompanying drawings, wherein:

Figure 1 is a side elevational view of apparatus embodying the features of this invention;

Figure 2 is a fragmentary side elevational view partly in section of the apparatus shown in Figure 1;

Figure 3 is a cross sectional view taken on the line 3—3 of Figure 1;

Figure 4 is a cross sectional view taken on the line 4—4 of Figure 1; and

Figure 5 is an enlarged sectional view of the die ring and pin or mandrel.

The apparatus to be presently described finds particular utility for extruding rubber or a rubber-like material into sheets having a thickness which corresponds to a specified dimension within very close limits. It will, of course, be understood as this description proceeds that the apparatus may be successfully employed to extrude materials other than rubber as long as they possess the characteristics required for extrusion.

Referring now more in detail to the apparatus selected herein for the purpose of illustrating the invention, it will be noted that the numeral 10 designates a frame having a vertical column 11 and having a pressure cylinder or tube 12 suitably mounted on the column. The outer end of the cylinder 12 has an opening 13 in the top wall for receiving the material to be extruded, and the inner end of the cylinder has a centrally disposed enlarged opening 14 at the inner end for the material. In accordance with conventional practice the material within the cylinder 12 is forced through the outlet opening 14 by a feed screw 15 extending into the cylinder through the outer end of the latter, and connected to suitable power means. The feed screw and the power means for operating the same are not shown in detail since they form no part of the present invention.

The inner surface of the enlarged opening 14 in the cylinder 12 is threaded for removably securing a die holder 16 in place. The die holder 16 comprises a sleeve 17, a retaining ring 18, and a clamping ring 19. The sleeve 17 extends into the enlarged opening 14 from the inner end of the cylinder 12, and is externally threaded for threadably engaging the inner surface of the opening 14. The internal diameter of the sleeve approximates the internal diameter of the cylinder 12 to form a continuation of the latter, and the material to be extruded is fed by the screw 15 into the sleeve 17.

The inner end of the sleeve 17 projects beyond the corresponding end of the cylinder 12 and is formed with an enlargement or head 20 on which the retaining ring 18 is supported. The ring 18 surrounds the head 20 on the sleeve 17 and extends axially inwardly beyond the inner side of the head 20 to form with the latter an annular recess 21 within which a die ring 22 is supported. The internal diameter of the annular recess 21 is somewhat greater than the external diameter of the die ring 22 to enable shifting movement of the die ring 22 in a plane perpendicular to the axis of the cylinder 12 or die holder 16. The die ring 22 is adjusted relative to the holder 16 by a series of studs 23 threadably engaging in a corresponding number of radially extending tapered bores formed in the retaining ring 18 and spaced equal distances from each other circumferentially of the ring 18.

The die ring 22 is firmly clamped against the head 20 on the sleeve 17 by the ring 19. The ring 19 is externally threaded and the portion of the retaining ring 18 extending axially beyond the die ring 22 is internally threaded for securing the clamping ring 19 in place. It follows from the above that the axis of the die opening may be adjusted in all directions perpendicular to the axis of the holder 16 or cylinder 12, and the purpose of this adjustment will be presently described.

Supported on a lateral extension 22' of the machine frame beyond the delivery side of the die ring 22 is a mandrel or pin 24 having a head 25 and a shank 26. The head 25 is suitably secured to the outer end of the shank and projects through the die ring 22 into the sleeve 17 from the delivery side of the die ring. As shown in Figure 5 of the drawings, a plate 25' is secured to the head 25 at the inner side of the latter and the peripheral surface S of the plate assumes a position within the confines of the inner surface S' of the die ring 22. The surfaces S and S' are correspondingly tapered in the manner shown in Figure 5, and cooperate to form an annular space 27 through which the material fed by the screw 15 is extruded in the form of a tube. It will further be noted that the portion of the head 25 extending into the sleeve 17 is tapered toward the axis of the head to provide a pilot for guiding the material fed by the screw 15 through the annular space 27.

After the head 25 is extended through the die ring 22, the studs 23 are manipulated to assure positioning the surfaces S and S' in exact concentric relationship, and provide the annular space 27 with a uniform width. As a result the material extruded through the annular space 27 has a uniform wall thickness, and this is highly advantageous in producing certain types of products. In accordance with this invention the width of the annular space 27, and accordingly, the wall thickness of the material extruded through this space may be readily varied to within very close limits by relatively moving the die ring 22 and pin 24 axially. In the present instance the above result is obtained by moving the pin 24 axially in either direction relative to the die ring 22 and this is accomplished in the following manner.

As shown in Figure 2 of the drawings, the inner end of the shank 26 on the mandrel 24 is splined in a bore formed in a part 29 in axial alignment with the die ring 22 and terminates in a reduced threaded portion 30. The reduced threaded portion 30 of the mandrel extends axially through an opening 31 formed in a post 32 spaced inwardly from the part 29. A manually operable control wheel 33 is threadably supported on the reduced portion 30 between the part 29 and the post 32. The arrangement is such that opposite sides of the hand wheel 33 respectively frictionally engage the adjacent sides of the part 29 and post 32 so that rotation of the wheel 33 imparts an axial movement to the mandrel 23 relative to the die 22. It follows from the above that rotation of the wheel 33 in one direction moves the tapered surface S on the head 25 of the mandrel in a direction toward the tapered surface S' on the die ring 22 to reduce the width of the annular space 27 and correspondingly reduce the thickness of the material extruded through this space. Of course rotation of the wheel 33 in the opposite direction increases the width of the annular space 27 and correspondingly increases the thickness of the material extruded through this space. By providing relatively fine threads on the hand wheel and mandrel, a micrometer adjustment may be obtained which enables very accurately controlling the thickness of the extruded material within very close limits.

The part 29 and post 32 are preferably secured to a plate 34, and the latter is supported on the extension 22' of the frame for sliding movement toward and away from the die ring 22. This arrangement greatly facilitates inserting the head on the mandrel or pin 24 into and removing the same from the die ring 22. Any suitable releasable latch means (not shown) may be employed for holding the plate 34 in position relative to the die ring.

Assuming that the mandrel or pin 24 is in its operative position shown in Figure 2 of the drawings, it will be noted that rotation of the screw 15 in one direction feeds the material introduced into the cylinder 12 over the pilot portion of the head 25 on the mandrel and through the annular space 27 in the form of a tube having a wall thickness corresponding to the width of the annular space 27. As the tube of material issues from the delivery side of the die ring 22, it is slit in a direction extending axially of the tube by a knife 35. The knife 35 is suitably secured to the outer face of the die holder 16 adjacent the bottom of the latter in a position to intercept the tubular material as it leaves the delivery side of the die ring 22, and slit the material.

Subsequent to or approximately at the same time the material is slit by the knife 35, it is engaged by a form 36 shaped to spread the material out into sheet form and to guide the same to the pressure rolls 37. The guide or form 36 extends from the die ring 22 to the pressure rolls 37 in a position to support the extruded material after it is slit and the top or supporting surface is perforated. An air chamber 38 communicates with the perforations, and air under pressure is passed through the perforations to apply a lifting force on the material as it passes over the form. Thus friction is reduced to a minimum, and a smooth uninterrupted surface on the stock is assured. The material leaving the form is passed between the pressure rolls 37 and the latter are driven by any suitable power means to feed the material to any selected processing equipment.

What I claim as my invention is:

1. In extrusion apparatus a die having an annular orifice through which material is extruded as a cylinder with a generally horizontal axis, and a supporting guide member having an end adjacent said die formed as a segment of the upper portion of said cylinder and within the same, said guide progressively increasing in width and in radius of curvature of its supporting surface to correspondingly change the form of the extruded cylinder advancing over the same.

2. The construction as in claim 1 having feed rollers beyond said guide for receiving the advancing extruded product therefrom.

3. The construction as in claim 1, said guide being hollow and having a multiplicity of distributed apertures through its upper surface, and means for forcing air in said hollow guide and through said apertures to form a supporting gaseous film for the advancing product.

JOHN R. STROBEL.

REFERENCES CITED

The following references are of record in the file of this patent:

UNITED STATES PATENTS

| Number | Name | Date |
|---|---|---|
| 544,517 | Peyton | Aug. 13, 1895 |
| 1,435,659 | Roberts | Nov. 14, 1922 |
| 1,769,730 | Wetmore | July 1, 1930 |
| 1,993,349 | Parkhurst | Mar. 5, 1935 |